(12) United States Patent
Dage et al.

(10) Patent No.: US 6,405,545 B1
(45) Date of Patent: Jun. 18, 2002

(54) HEATING VENTILATING AND AIR CONDITIONING SYSTEM FOR VEHICLES

(75) Inventors: Gerhard A. Dage, Franklin; Lyle C. Doerr, Canton, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/728,203

(22) Filed: Dec. 1, 2000

(51) Int. Cl.[7] .............................................. B60H 1/32
(52) U.S. Cl. ............................................ 62/133; 62/303
(58) Field of Search ........................... 62/133, 186, 303

(56) References Cited

U.S. PATENT DOCUMENTS

| | | |
|---|---|---|
| 4,497,240 A | 2/1985 | Nagatomo et al. |
| 4,593,609 A | 6/1986 | Nagatomo et al. |
| 5,203,737 A | 4/1993 | Joseph et al. |
| 5,385,028 A * | 1/1995 | Gavlak ........................... 62/81 |
| 5,749,236 A * | 5/1998 | Tavian et al. .................. 62/186 |
| 5,899,082 A * | 5/1999 | Stein et al. .................... 62/133 |

FOREIGN PATENT DOCUMENTS

| | | |
|---|---|---|
| DE | 28 15 012 | 10/1978 |
| JP | 58-209612 | 12/1983 |
| JP | 62-157822 | 7/1987 |

* cited by examiner

*Primary Examiner*—Denise L. Esquivel
*Assistant Examiner*—Marc Norman
(74) *Attorney, Agent, or Firm*—Larry I. Shelton

(57) ABSTRACT

An air conditioning system for vehicles including a damper door which is normally maintained in a position to permit outside air to circulate through the system to militate against the retention moisture and thereby discourage microbial growth.

6 Claims, 1 Drawing Sheet

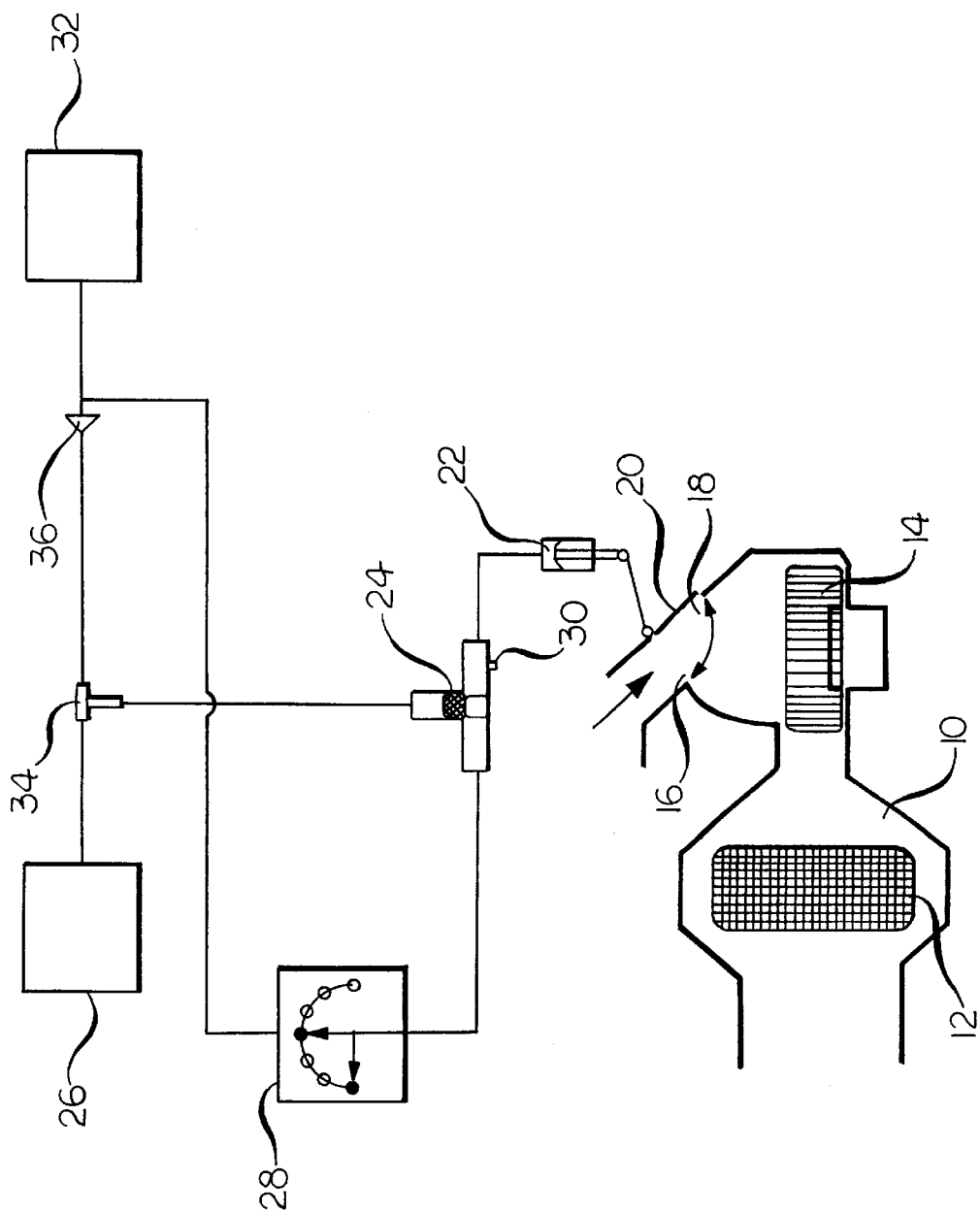

HEATING VENTILATING AND AIR CONDITIONING SYSTEM FOR VEHICLES

FIELD OF THE INVENTION

The present invention relates to air conditioning systems for vehicles and more particularly to such systems wherein the interior of the systems is placed in communication with the atmosphere when the system is idle to militate against the formation and growth of microbial organisms, such as bacteria.

BACKGROUND OF THE INVENTION

In existing air conditioning systems for vehicles, water tends to accumulate in the housing in which the evaporator is located. After a period of time, microbial growth tends to form, resulting in the source of objectionable odor. It has been discovered that the microbial growth is accelerated when air flow past the evaporator is greatly reduced or eliminated. The above condition tends to occur when the vehicle has been parked and the ignition is turned off. When the ignition is off, air conditioning (HVAC) systems with vacuum-type actuators will typically return or default to the same state that the system was in while the ignition was on. In the default condition, the door providing for re-circulation of interior air and prohibiting the admission of outside air will remain in the same state as it was when the ignition was on. If it remains in the recirculation state, air flow past the evaporated core is greatly reduced or eliminated during the period the vehicle is parked. It is at this stage that the microbial growth commences. The next time the ignition is turned on and the associated HVAC blower is caused to be energized, a severe odor is promptly detected.

Accordingly, it is desirable to open the interior of the HVAC housing to the outside air to improve interior air circulation and ventilation and greatly reduce microbial growth and the resultant objectionable odor.

It is an object of the invention to produce an HVAC system for a vehicle wherein the housing for the system will be automatically exposed to outside air after the ignition is turned off.

Another object of the invention is to produce an HVAC system for a vehicle wherein the cabin pressure and vacuum tend to be relieved to thereby facilitate the opening and closing of the vehicle doors.

SUMMARY OF THE INVENTION

The above as well as the objects and advantages of the invention may be achieved in an air conditioning system including a heat exchanger and a blower for moving air through the heat exchanger comprising a conduit providing communication between the atmosphere and the heat exchanger; a normally open valve in the conduit; a vacuum operated motor coupled to the valve; a source of vacuum; and a switch to selectively provide communication between said motor and said source of vacuum to effect movement of the valve to prevent communication between the atmosphere and the evaporator through the first conduit.

BRIEF DESCRIPTION OF THE DRAWING

The above objects and advantages of the invention will become readily apparent to those skilled in the art from reading the following detailed description of the invention when considered in the light of the accompanying drawing in which there is illustrated a schematic of a system opening the interior of the housing for the associated apparatus of an HVAC system for a vehicle to the outside air or the atmosphere.

DETAILED DESCRIPTION OF THE PREFERRED EMBODIMENT

Referring to the drawing, there is illustrated a portion of an HVAC system for a vehicle, which contains a housing 10, evaporator core or heat exchanger 12, and a blower 14. The housing 10 is provided with an intake or opening 16 for outside air, and an intake or opening 18 for re-circulating air.

A pivotally mounted damper door 20 is disposed such that in the illustrated embodiment, the damper door 20 is disposed to prevent air passage through the intake 18 and permitting air passage though the intake 16.

A vacuum motor 22 is coupled to the damper door 20 in any conventional manner, such as by a suitable linkage member. With the connection between the vacuum door 22 and the damper door 20, the door 20 may be selectively positioned to block the intake 18 or to block the intake 16.

The vacuum motor 22 is normally operative to maintain the damper door 20 in the position illustrated allowing the interior of the housing 10 to communicate with the atmosphere through the intake 16.

The vacuum motor 22 is typically a two-position motor and is coupled to a spring loaded vacuum switch 24. The secondary side of the switch 24 is coupled to a re-circulating vacuum source 26 between a mode control switch 28 and the vacuum motor 22. The primary side of the vacuum switch 24 is connected to the vacuum source 26 which is typically the manifold of the associated internal combustion engine of the vehicle.

A bleed valve 30 is inserted in the line between the mode control switch 28 and vacuum motor 22. The typical bleed rate of the bleed valve 30 may be approximately ½ to 1 micron and is typically determined by the timing desired for the system to default to outside air after the vehicle ignition is turned off and the engine has stopped.

The vacuum source 26 is coupled to a reservoir 32 through a tee connection 34 and a check valve 36. The other connection of the tee connection 34 is coupled to the vacuum switch 24.

In operation, the normally closed vacuum switch 24 is actuated by starting the vehicle engine. The engine manifold vacuum source 26 causes the vacuum switch 24 to open and simultaneously the vacuum motor 22 is energized causing the damper door 20 to move to a position blocking the intake of fresh air through the intake 16.

It will be understood that the bleed valve 30 is small enough as to not hinder the normal operation. Wide open throttle does not have any impact on the system, since the entire system is backed up by the vacuum reservoir 32.

When the ignition is switched to an off position, the spring loaded vacuum switch 24 closes thereby causing the damper door 20 to move to the normal position, as illustrated in the drawing. Since the vacuum switch 24 is sealed off from the rest of the system, as the bleed down occurs through the bleed valve 30, the spring loading of the switch 24 defaults to the no vacuum or normal state. In the no vacuum state the housing 10 is in direct communication with outside air without any negative impact on the other portions of the system.

In the light of the above description, it will be readily apparent that any moisture that has formed in the housing 10; by way of condensation emanating from the core of the evaporator 12 for example, will tend to be evaporated thereby militating against the growth of bacteria and the creation of noxious odors.

It has also been found that the aforedescribed system also eliminates the problem caused by excessive cabin pressure and excessive cabin vacuum. Presently many vehicles are designed with body component tolerances such that occupants have difficulty closing and opening entry doors. These problems were found to be due mainly to excessive cabin pressure and excessive cabin vacuum. The obvious solution to the problem was considered to be the addition of a separate permanent vent. However, the solution would have had a negative impact on body leakage and HVAC performance and Noise (NVH). Surprisingly, the instant invention has a positive effect on relieving cabin pressure and vacuum by way of the HVAC outside air intake.

From the foregoing description, one ordinarily skilled in the art can easily ascertain the essential characteristics of the invention and, without departing from the scope and spirit thereof, can make various changes and modifications to the invention to adapt it to various usages and conditions in accordance with the scope of the appended claims.

What is claimed is:

1. An air conditioning system including a heat exchanger and a blower for moving air through the heat exchanger comprising:

a conduit providing communication between the atmosphere and the heat exchanger;

a normally open valve in said conduit;

a vacuum operated motor coupled to said valve;

a source of vacuum;

a switch to selectively provide communication between said motor and said source of vacuum to effect movement of said valve to prevent communication between the atmosphere and the heat exchanger through said conduit; and a bleed valve disposed between said motor and said switch to provide a controlled rate of vacuum relief to said motor.

2. An air conditioning system as defined in claim 1 wherein said vacuum switch is normally closed.

3. An air conditioning system as defined in claim 1 wherein said normally open valve is a damper door.

4. An air conditioning system as defined in claim 3 wherein said damper door is pivotally mounted in said conduit.

5. An air conditioning system as defined in claim 1 wherein said vacuum operated motor normally maintains said valve in an open position.

6. An air conditioning system as defined in claim 1 wherein said switch is vacuum operated.

* * * * *